US010184737B2

(12) United States Patent
Roberts

(10) Patent No.: US 10,184,737 B2
(45) Date of Patent: Jan. 22, 2019

(54) HYBRID POLYMER LOWER RECEIVERS FOR FIREARMS AND METAL THREADED INSERTS, KITS AND METHODS THEREFOR

(71) Applicant: David K Roberts, Dyersburg, TN (US)

(72) Inventor: David K Roberts, Dyersburg, TN (US)

( * ) Notice: Subject to any disclaimer, the term of this patent is extended or adjusted under 35 U.S.C. 154(b) by 27 days.

(21) Appl. No.: 15/491,609

(22) Filed: Apr. 19, 2017

(65) Prior Publication Data
US 2017/0219305 A1    Aug. 3, 2017

Related U.S. Application Data

(63) Continuation of application No. 14/247,763, filed on Apr. 8, 2014.
(Continued)

(51) Int. Cl.
*F41A 3/66* (2006.01)
*F41C 23/06* (2006.01)
(Continued)

(52) U.S. Cl.
CPC ............... *F41A 3/66* (2013.01); *B29C 45/14* (2013.01); *F41C 23/06* (2013.01); *B29L 2001/00* (2013.01); *B29L 2031/777* (2013.01)

(58) Field of Classification Search
CPC .......... F41C 23/06; F41C 23/08; F41C 23/16; F41C 23/00; F41C 23/18; F41A 3/66; F41A 3/78; F41A 3/74
(Continued)

(56) References Cited

U.S. PATENT DOCUMENTS 3,336,691 A    8/1967 Allyn
6,526,683 B1 *  3/2003 Crandall ................ F41A 19/09
                                                    42/40
(Continued)

FOREIGN PATENT DOCUMENTS

WO    WO 2011/157383    12/2011

OTHER PUBLICATIONS

Ring/ The lightest lightweight AR lower receiver; posted on Sep. 27, 2012; one page; included as part of the Final Office action dated Jun. 13, 2016 on p. 6.

*Primary Examiner* — Stephen Johnson
(74) *Attorney, Agent, or Firm* — Eric B. Fugett; Mark A. Pitchford; Pitchford Fugett, PLLC

(57) ABSTRACT

Threaded metal inserts for polymer lower receivers and hybrid polymer lower receivers comprising one or more of such inserts, as well as kits and methods therefor are disclosed. A threaded metal insert has a substantially circular aperture configured with screw threads to releasably yet connectively interface with a separate traditionally threaded firearm component such as a buffer tube or a pistol grip screw. Inserts can be any overall shape so long as it can be integrally embedded within a traditionally threaded portion of a polymer lower receiver in a way that does not interfere with normal operation of an assembled firearm and leaves exposed the internal threading of the insert. Inserts can also comprise textural features on the exterior surface configured to permanently interface with and embed the an insert into molded polymer. A hybrid polymer and metal lower receiver is a stripped polymer lower receiver for an AR type firearm, such as the AR-15 or AR-10, having one or more such threaded metal inserts at least partially embedded in a portion thereof.

7 Claims, 9 Drawing Sheets

Related U.S. Application Data

(60) Provisional application No. 61/841,084, filed on Jun. 28, 2013.

(51) Int. Cl.
*B29C 45/14* (2006.01)
*B29L 1/00* (2006.01)
*B29L 31/00* (2006.01)

(58) Field of Classification Search
USPC .............................. 42/75.03, 75.1, 74, 71.02
See application file for complete search history.

(56) References Cited

U.S. PATENT DOCUMENTS

| | | |
|---|---|---|
| 7,082,709 B2 | 8/2006 | Lindsey |
| 7,428,795 B2 | 9/2008 | Herring |
| 8,141,287 B2 | 3/2012 | Dubois |
| 8,342,075 B2 | 1/2013 | Gomez |
| 8,615,917 B2 | 12/2013 | Higgins |
| 8,789,305 B1 * | 7/2014 | DiChario .................. F41A 3/66 42/75.03 |
| 8,789,395 B2 | 7/2014 | Hong |
| 9,328,980 B1 * | 5/2016 | Doto ........................ F41A 35/00 |
| 2003/0140543 A1 | 7/2003 | Yeargin |
| 2010/0162604 A1 | 7/2010 | Dubois |
| 2010/0162609 A1 * | 7/2010 | Rogers .................... F41C 23/02 42/85 |
| 2012/0180353 A1 | 7/2012 | Holmberg |
| 2012/0260793 A1 | 10/2012 | Gomez |
| 2012/0297656 A1 | 11/2012 | Langevin |
| 2013/0212920 A1 | 8/2013 | Law |

* cited by examiner

HYBRID POLYMER LOWER RECEIVERS FOR FIREARMS AND METAL THREADED INSERTS, KITS AND METHODS THEREFOR

CROSS-REFERENCE TO RELATED APPLICATION

This application is a continuation application of co-pending U.S. patent application Ser. No. 14/247,763, filed on Apr. 8, 2014 entitled "HYBRID POLYMER LOWER RECEIVERS FOR FIREARMS AND METAL THREADED INSERTS, KITS AND METHODS THEREFOR," which claims priority to U.S. Provisional Patent Application No. 61/841,084, filed Jun. 28, 2013 and entitled "METAL THREADED INSERTS FOR POLYMER LOWER RECEIVERS," the contents of both of which are hereby incorporated by reference in their entirety.

TECHNICAL FIELD

The disclosure relates generally to the field of firearms, and particularly to synthetic receivers for firearms. More specifically, the disclosure concerns threaded metal inserts for polymer lower receivers and hybrid polymer lower receivers comprising one or more such inserts, as well as kits and methods therefor.

BACKGROUND

The information provided below is not admitted to be prior art to the present invention, but is provided solely to assist the understanding of the reader. All U.S. patents and patent applications and other published documents mentioned anywhere in this application are incorporated by reference in their entirety.

The family of semi-automatic firearms based on the original ARM ELITE AR-15 and COLT M16 rifles has achieved significant success with military, law enforcement and civilian shooters alike and is currently one of the broadest and most popular in the world. Improvements to the AR-15/M16 platform are diverse in their purpose, with new embodiments and aftermarket parts and accessories continually being developed due to the overwhelming popularity and inherent modularity of the base platform. Although the template firearm design itself has undergone many refinements to improve its functional reliability, to expand its mission roles, and to reduce its manufacturing costs, the design's principles of operation have not been significantly improved. In fact, firearms patterned after the reputable AR-15/M16 template using the same basic design features and specifications are currently produced in numerous calibers and countless versions and configurations by different manufacturers throughout the world.

The term "AR-15®" as used herein refers to the rifle manufactured by COLT DEFENSE LLC or its licensees at the time of invention. Semi-automatic variants and derivatives of the AR-15/M16 produced by other manufacturers are usually termed "AR-15 type" or "AR-15 style" regardless of caliber and are sold under various proprietary model designations. The term "AR type" is used in this disclosure to refer to authentic semi-automatic COLT firearms based on the AR-15/M16 platform such as the AR-15, AR-15 Sporter SP1, AR-15A2 Match Target and AR6720, as well as semi-automatic versions of AR-15 type firearms such as the ARMALITE AR-10, REMINGTON R-15 and the BUSHMASTER XM-15 rifles at the time of invention.

The use of lighter weight synthetic materials such as reinforced composites and polymers (collectively, "polymers" or "synthetics") to form various parts of a firearm such as a receiver or frame for a handgun or rifle has increased significantly in recent years. Lighter weight synthetic materials provide the firearm with a reduced weight for ease of carrying, handling and use in the field, on the range and during combat. For example, by reducing the weight of a firearm, the user generally is able to manipulate the firearm faster and easier, such as while tracking moving targets. The lighter weight also means less load that must be borne by the user during transport and use, which conserves the user's energy, reduces fatigue and increases accuracy. Additionally, most lighter weight synthetic materials now being used for firearms are typically less susceptible to corrosion and damage resulting from exposure to water, salt, dirt, and other environmental hazards. Moreover, many modern polymers are easier and less costly to manufacture into firearm components than traditional metal substrates such as forged aluminum, aluminum billet or steel, making components formed from synthetic materials more affordable.

A major problem associated with the use of lighter weight polymer materials to form parts of a firearm, particularly receivers and actions, is that such materials sacrifice strength and the ability to withstand the extreme pressures and stresses created upon firing a round of ammunition in exchange for lighter weight. For example, upon discharge of an AR type firearm, the basic design of which is well known in the art, the bolt is forced rearward to an open position to eject the spent cartridge and ready the chamber to receive a new round, after which the new round is loaded in the chamber by the capture and backflow of gases created upon the firing of the previous round of ammunition. The extreme chamber pressures and recoil forces resulting from the travel of the bolt are primarily borne by the receiver of the firearm. Over time, such extreme stresses can cause cracking and potentially failure in a receiver formed from some lighter weight synthetic materials. For example, the primary point of stress and the most likely point of failure in an all polymer lower receiver for an AR type firearm is around the threaded ring or collar disposed at the rear end of the lower receiver body that is configured to accept and connectively engage with a threaded receiver extension (also commonly and interchangeably known as a "buffer tube"). Much of the stress caused by the recoil force of a discharging AR type firearm is focused around the point where these two components engage.

A further related consequence of using lighter weight, polymer-based materials such as plastics and reinforced composites to form synthetic firearm receiver bodies has been that such materials typically are not as durable as conventional forged steel or aluminum, the traditionally preferred substrates for firearm receivers. More pointedly, the threaded portions of all-polymer receivers tend to wear out more quickly, especially when connectively engaged by conventional metal screws or screw threads, which leads to a higher chance of failure and thus an increased risk of firearm malfunction and shooter injury during use. This defect is of particular concern to users of AR type polymer lower receiver bodies (as used herein, the term "lower receiver body" means a lower receiver stripped of all its operational components, also commonly known in the art as a "stripped" lower receiver) because many of the currently available parts, components and accessories for AR type firearms, such as the buffer tube and pistol grip retaining screw, are still made from one or more types of metal and are configured to engage the lower receiver body using screw threads. No suitably strong, yet lightweight AR type stripped lower receiver durable enough to lastingly withstand recoil stress and engagement with metal screws is currently available.

More durable, lighter weight AR type stripped receivers, including upper and lower receivers and lower receiver assembly kits are still being sought. As a result, it is desirable to provide a threaded metal insert for a polymer lower receiver body, particularly for an AR type polymer lower receiver such as that of an AR-15 or AR-10, that provides the greater durability and increased strength and longevity of traditional metal alloys but which does not substantially affect the lighter weight imparted by the polymer. It is also desirable to provide an inexpensive, hybrid polymer and metal stripped lower receiver for an AR type firearm such as an AR-15 or AR-10 that overcomes the foregoing shortcomings of the prior art to deliver a lighter weight, corrosion resistant, stripped lower receiver having superior strength and durability that functions with substantially all high quality conventional AR type (upper and lower) receiver parts kits, yet does not require the use of any specific caliber, brand or type of parts. It is also desirable to provide methods for economically manufacturing such threaded metal inserts and hybrid polymer lower receivers. Accordingly, a need exists for an improved polymer lower receiver for AR type firearms that addresses the foregoing and other related problems in the art to combine the lighter weight and corrosion resistance of all-polymer lowers with the greater strength and durability of traditional metal components. Other objects and advantages will become apparent from the following disclosure.

SUMMARY

Aspects of the present disclosure provide devices and methods that overcome the foregoing limitations of existing synthetic lower receivers for AR type firearms. In some aspects, the present disclosure provides threaded metal inserts for use with polymer receivers for a firearm. In other aspects, the disclosure provides hybrid stripped lower receiver bodies for semi-automatic AR type firearms, such as AR-15 rifles, that are formed from a strong, corrosion-resistant synthetic material such as a high-impact, reinforced polymer and one or more threaded metal inserts. While many firearms may benefit from the present disclosure, the threaded metal inserts and hybrid lower receiver bodies described herein are particularly useful with receivers for the family of semi-automatic rifles typified by the AR-15/M16 platform, regardless of caliber.

In some aspects, a threaded metal insert constructed in accordance with the present disclosure is a one-piece, cylindrical or ring-shaped member (i.e., an insert body) having a hollow or vacant, substantially tubular or circular center, respectively. Inserts are designed to be at least partially embedded within a polymer lower receiver body and generally comprise an insert body having an aperture with an interior surface configured with screw threads and an exterior surface configured with one or more textural features. The inserts are designed to reliably and lastingly engage and repeatedly interface with common threaded metal AR type firearm components, such as a buffer tube or a pistol grip retaining screw and to permanently interface with a synthetic material used to form a stripped lower receiver for a firearm. The inserts are typically made of a metal or metallic substance, such as marine grade brass. In one aspect, a threaded metal insert is designed to be at least partially, and in some embodiments, wholly embedded within or molded into the receiver extension housing (i.e., the rear portion of an AR type rifle receiver where the buffer tube connects to the receiver; interchangeably referred to as the buffer tube "ring" or "collar") of a polymer lower receiver for an AR type rifle. In another aspect, the disclosure provides a threaded metal insert designed to be at least partially, and in some embodiments, wholly embedded within or molded into the pistol grip screw hole of a polymer lower receiver body for a firearm. Once embedded with the polymer, the threaded metal inserts are made integral to the stripped lower receiver.

In other aspects, the present disclosure provides a hybrid lower receiver comprising a polymer lower receiver body for an AR type firearm and at least one threaded metal insert at least partially embedded therein. In some embodiments, a threaded metal insert configured to accept and releasably yet connectively interface with a threaded buffer tube is at least partially embedded within and reinforces the buffer tube collar at the rear of the polymer lower receiver body. In additional embodiments, a threaded metal insert configured to accept and releasably yet connectively interface with a pistol grip screw is at least partially embedded within and reinforces the pistol grip attachment point of the polymer lower receiver body. The hybrid lower receiver is compatible with substantially all currently available synthetic and metallic lower receiver parts kits, components and accessories for AR type firearms regardless of caliber. For example, hybrid lower receivers constructed in accordance with the present disclosure are compatible with substantially all available high capacity ammunition magazines, trigger group and hammer assemblies, safety and selector switches, bolt catches, takedown and pivot pins, selector and takedown detent pins, plungers, springs, disconnectors, receiver extensions (i.e., buffer tubes) and buttstocks.

In another aspect, the present disclosure provides kits of hybrid polymer lower receiver and methods for manufacturing threaded metal inserts, hybrid polymer lower receivers and hybrid polymer lower receiver kits.

A hybrid polymer and metal lower receiver body disclosed herein can be distinguished from the prior art by the presence of an integral threaded metal insert injection molded or otherwise embedded within the polymer. The inserts are disposed at one or more locations on the lower receiver body that are traditionally threaded or subject to high-pressure stress during normal use and operation of the firearm. By reinforcing the traditionally weakest points of the polymer lower receiver body with a threaded metal insert, the hybrid polymer lower receiver eliminates the inherent weakness of polymer threads in all-polymer lower receivers and provides an inexpensive hybrid lower receiver that is noticeably lighter than most aluminum lowers, yet has the strength and durability of a steel or alloy lower, thus giving it a noticeable gain in functionality. This presents an improvement over prior art synthetic lower receiver systems by combining the lighter weight and corrosion resistance of all-polymer lower receivers with the superior strength and durability of traditional metal receivers.

Accordingly, the threaded metal inserts and hybrid lower receivers described in the present disclosure solves the longstanding need for stronger and more durable yet lightweight and cost effective polymer lower receivers for AR type rifles by substituting metal threads in place of polymer threads and reinforcing high pressure stress points with a strong integral threaded metal insert. The use of a threaded metal insert extends the usable life and increases the reliability of the polymer lower receiver body by alleviating the excessive stress and wear placed on polymer threads and buffer tube collars by sustained firing when threaded metal parts and components are connectively engaged with polymer threads. The threaded inserts and hybrid polymer lower receivers of the present disclosure also dramatically reduce the risk of firearm malfunction and user injury that could otherwise result from the use of all polymer lower receivers. In this way, the devices and methods described herein provide increased user safety, greater firearm longevity and a more positive shooting experience.

These and other aspects and advantages of the devices and methods described herein will be better understood and appreciated by those skilled in the art by reference to the accompanying drawings briefly described below in conjunction with the following detailed description, wherein certain preferred embodiments including the best mode are described. It is to be understood that the specific devices and processes illustrated in the attached drawings and described in the following detailed description are exemplary embodiments of the inventive concepts defined in the claims below. Hence, specific dimensions and other physical characteristics relating to the embodiments disclosed herein are to be regarded as illustrative in nature and not as restrictive, unless the claims expressly state otherwise.

DETAILED DESCRIPTION

The present disclosure provides threaded metal inserts for use in polymer lower receivers for semi-automatic firearms as well as hybrid polymer and metal lower receiver bodies (i.e., stripped lower receivers) comprising one or more such threaded metal inserts and kits and methods therefor. Hybrid polymer lower receivers constructed in accordance with the present disclosure comprise one or more threaded metal inserts integrally embedded or injection molded within a suitably strong, corrosion resistant synthetic material such as a high-impact, reinforced polymer used to form the lower receiver body. Briefly stated, the threaded metal inserts and hybrid polymer lower receiver bodies disclosed herein provide users with stronger, more durable, inexpensive and lighter weight stripped lower receivers for AR type firearms, such as the AR-15 and AR-10 rifles, than are currently available.

Figure 1A:
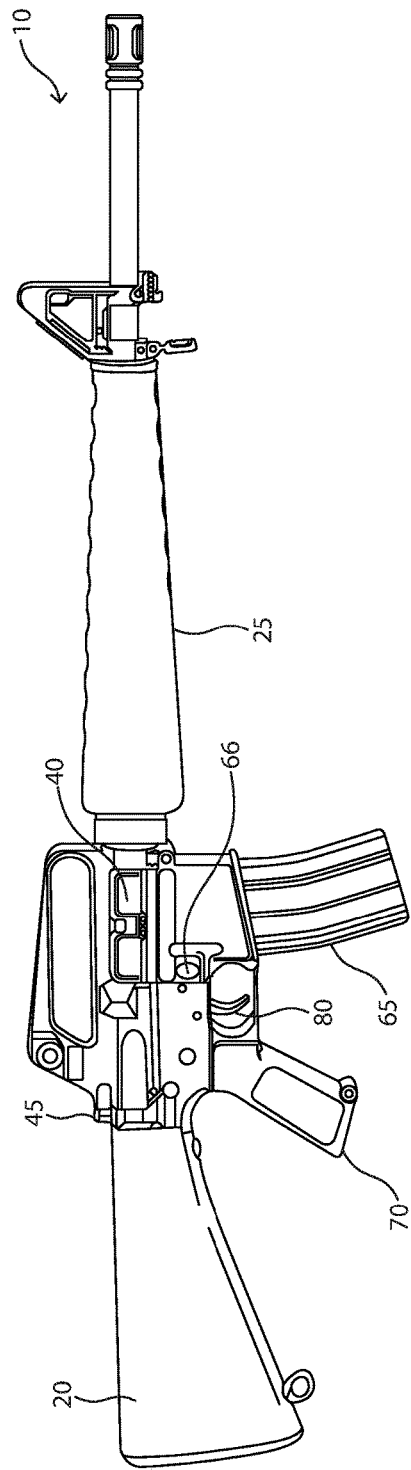
FIGS. 1A and 1B are right and left side elevations, respectively, of an assembled prior art AR-15 rifle.
Figure 1B:
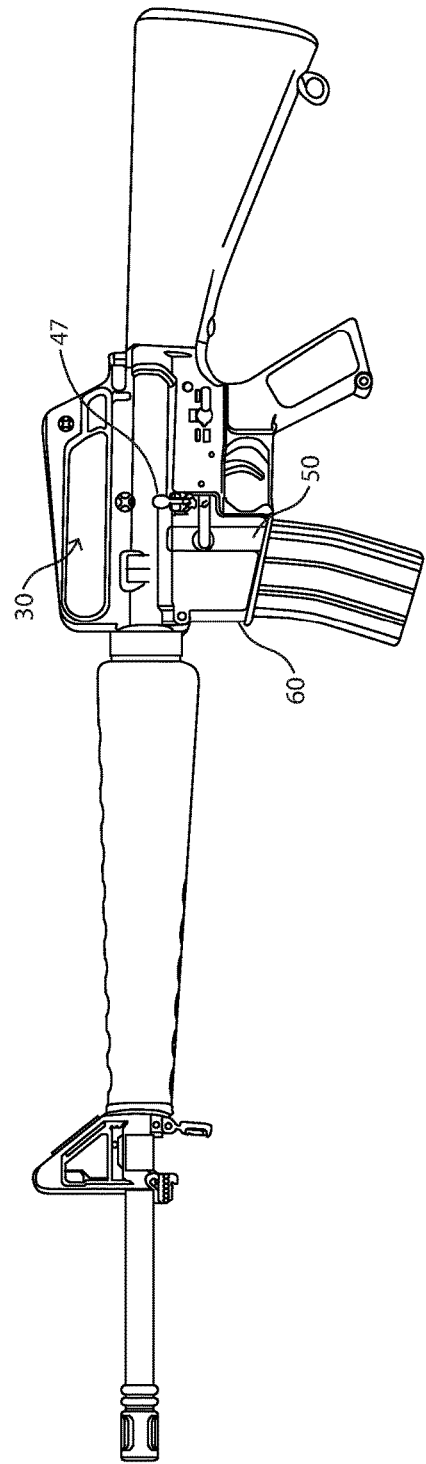

Turning now to the drawings, where like reference numbers refer to like elements, there is illustrated in FIGS. 1A and 1B each side of a typical AR-15 rifle 10. The words "front," or "distal" correspond to the firing direction the assembled firearm 10 is facing in FIGS. 1A and 1B (i.e., to the right as shown in FIG. 1A). The words "rear," "proximal" or "back" correspond to the direction opposite the firing direction of the assembled firearm 10 (i.e., to the left as shown in FIG. 1A). The firearm 10 includes a buttstock 20 connected to a receiver 30 comprised of two separable structural pieces known in the art as an upper receiver 40 and a lower receiver 50. The receiver 30 is connected to a barrel hand guard 25. A pistol grip 70 is located rear of a trigger 80. The lower receiver 50 includes a magazine well 60 that interfaces with a magazine of ammunition 65. The magazine 65 is removable by depressing a magazine release button 66 installed on the lower receiver 50 and stripping or pulling the magazine 65 out of the magazine well 60. The receiver 30 also houses a charging handle 45, which is used to charge a bolt (not shown). A bolt-catch 47 is used to lock a bolt in a rearward open position. The bolt-catch 47 is also activated to release the bolt into a firing position and is therefore sometimes referred to as a bolt release mechanism or button. Unless otherwise noted, the various components which make up the trigger, buttstock, bolt carrier, and barrel assemblies are as those found on the prior art AR type rifles and their various embodiments.

Figure 2A:
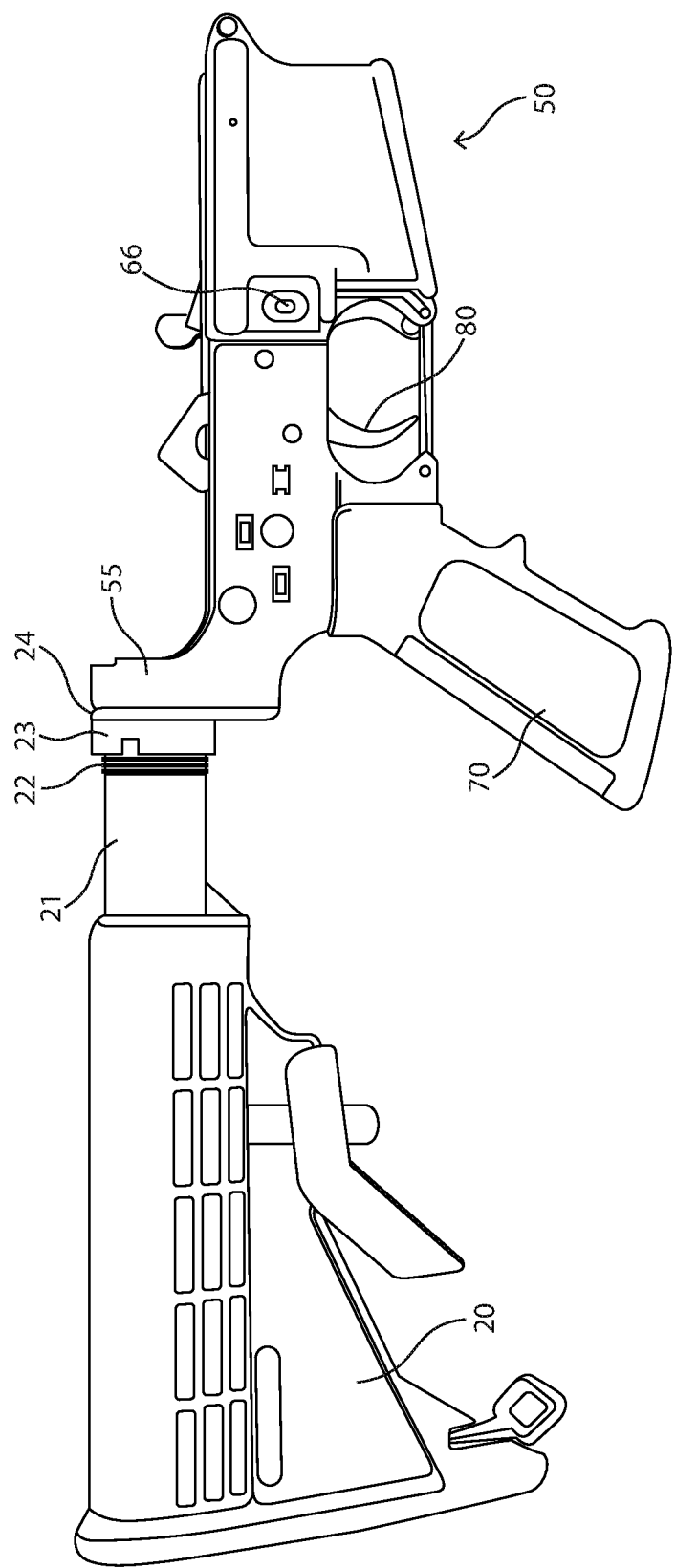
FIGS. 2A and 2B are right and left side elevations, respectively, of a typical prior art AR-15 type lower receiver assembly.
Figure 2B:
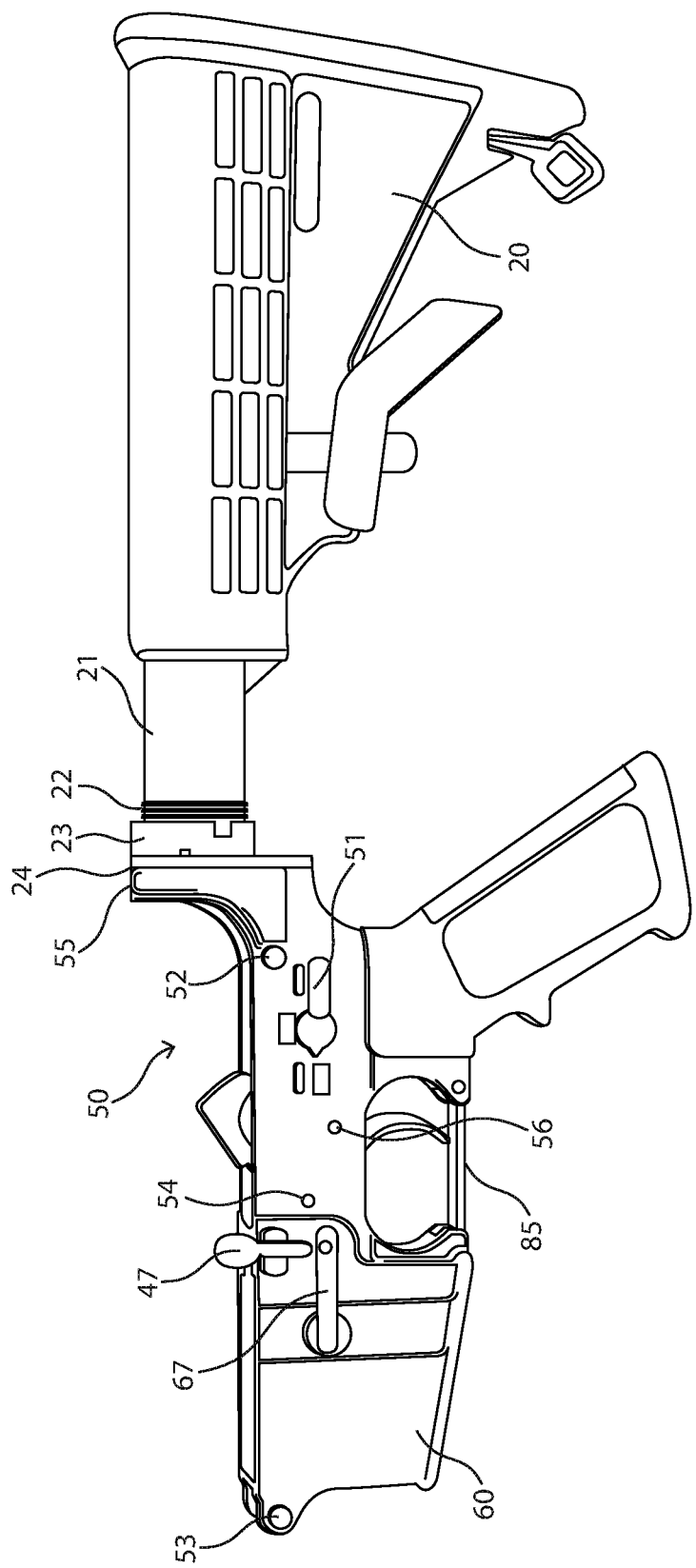

Referring now to FIGS. 2A and 2B, there are depicted side elevations of a typical prior art AR-15 type lower receiver assembly. The lower receiver assembly comprises a lower receiver body 50 having a trigger guard 85, a magazine well 60, and a buffer tube collar 55. The lower receiver assembly further comprises a buffer tube 21, a collapsible stock 20 and a pistol grip 70 attached to the lower receiver body 50, as well as a safety selector lever 51, a rear take down pin 52, a pivot pin (also known as a "forward take down pin") 53, a hammer pin 54, a trigger pin 56, a bolt-catch 47, a magazine release button 66 and a magazine catch 67 installed therein. The stock 20 may be of any suitable design, including but not limited to fixed, collapsible, or retractable. In some embodiments, the stock 20 or trigger guard 85 or both may be absent. Additionally, the magazine well 60 may be straight sided or have a flare or chamfer about the exterior opening to facilitate insertion of a magazine. The stock 20 is attached to the lower receiver 50 at the receiver extension housing 55 via a receiver extension (also interchangeable known as a "buffer tube") 21. A receiver extension or buffer tube 21 is well known in the art and is a generally cylindrical hollow tube configured with screw threads 22 to connectively interface with complimentary threads disposed in the interior of the buffer tube collar 55. In some embodiments, the screw threads 22 are commercial specification ("comm-spec") threads. In other embodiments, the screw threads 22 are military specification ("mil-spec") threads. The buffer tube 21 is secured in position in buffer tube collar 55 of the lower receiver 50 by a locking nut (also known as a "castle nut") 23 and a receiver plate 24.

Figure 3:
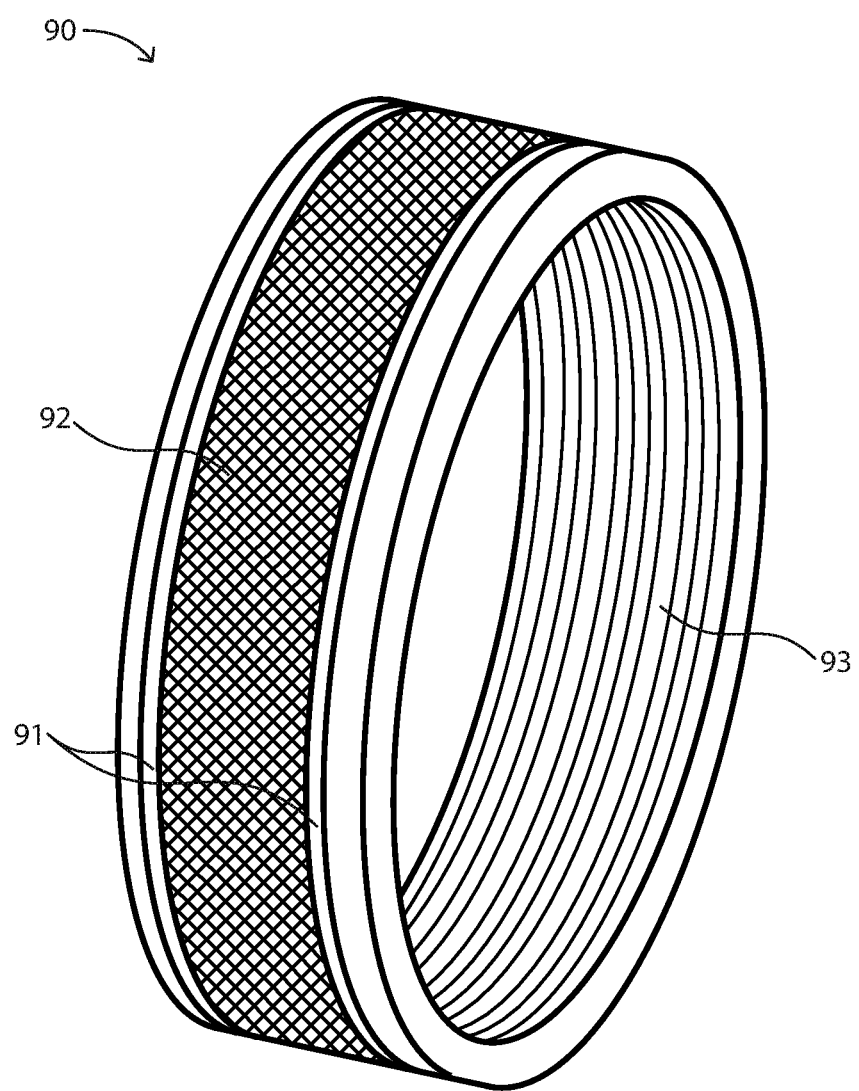
FIG. 3 is a perspective view of one embodiment of a threaded metal insert disclosed herein.

Referring now to FIG. 3, there is shown one embodiment of a threaded metal insert 90 constructed in accordance with an aspect of the present disclosure. Generally, a threaded metal insert 90 is a ring-shaped, cylindrical or otherwise generally rounded member (an insert body) having a vacant, substantially circular or tubular aperture configured with screw threads 93 to receive and connectively yet removably interface with a separate traditionally threaded firearm component such as a buffer tube or a pistol grip screw. The aperture extends linearly through at least a portion of an insert body from a surface thereof. However, in some embodiments, the aperture may extend completely through an insert. The inserts disclosed herein are designed to be embedded within a polymer lower receiver so that the threads on the interior of the aperture remain exposed for use even though the rest of the insert may be otherwise completely embedded within or covered by polymer.

Figure 5:
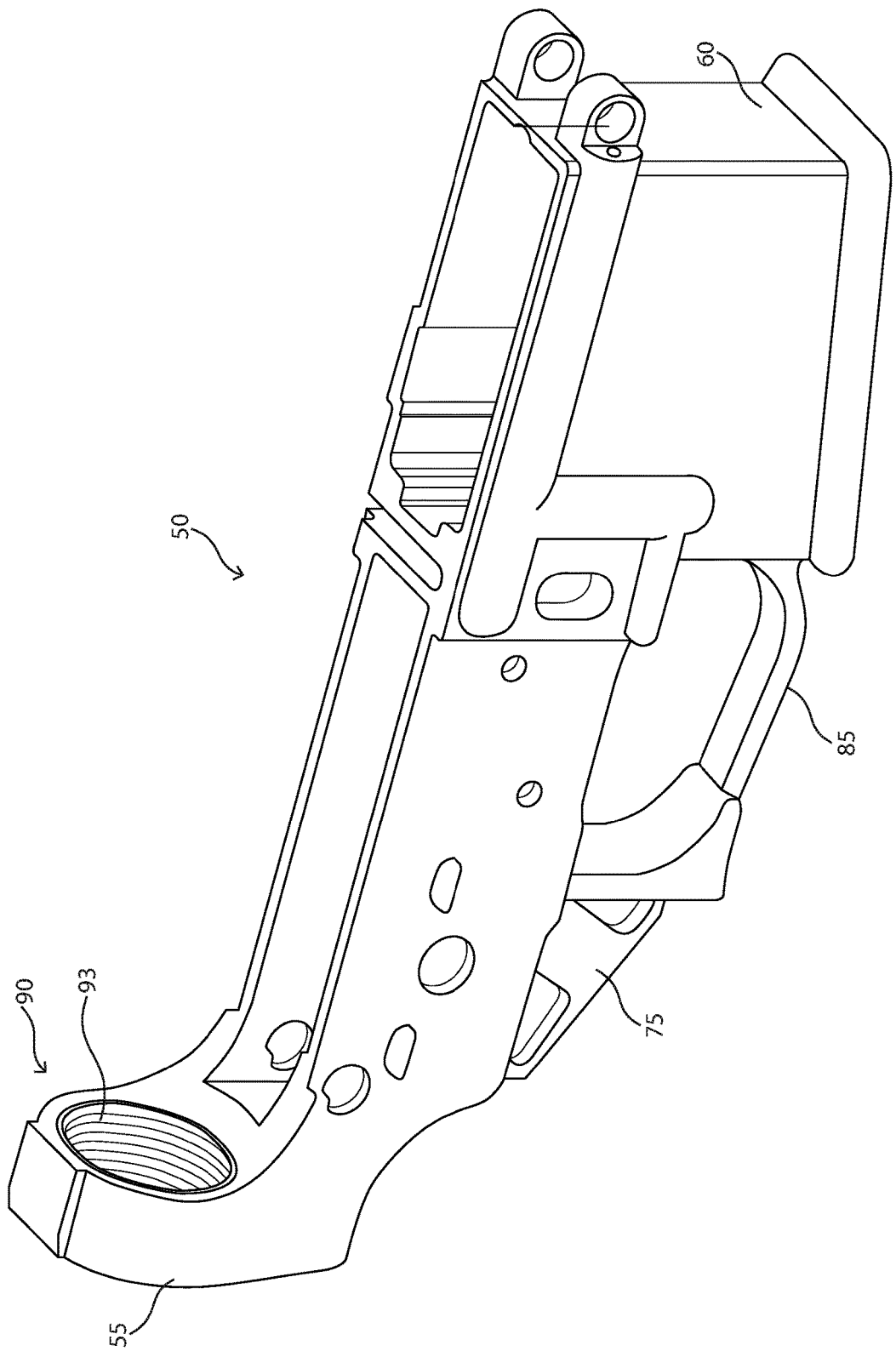
FIG. 5 is a right side perspective view of the stripped hybrid polymer lower receiver of FIG. 4.
Figure 6:
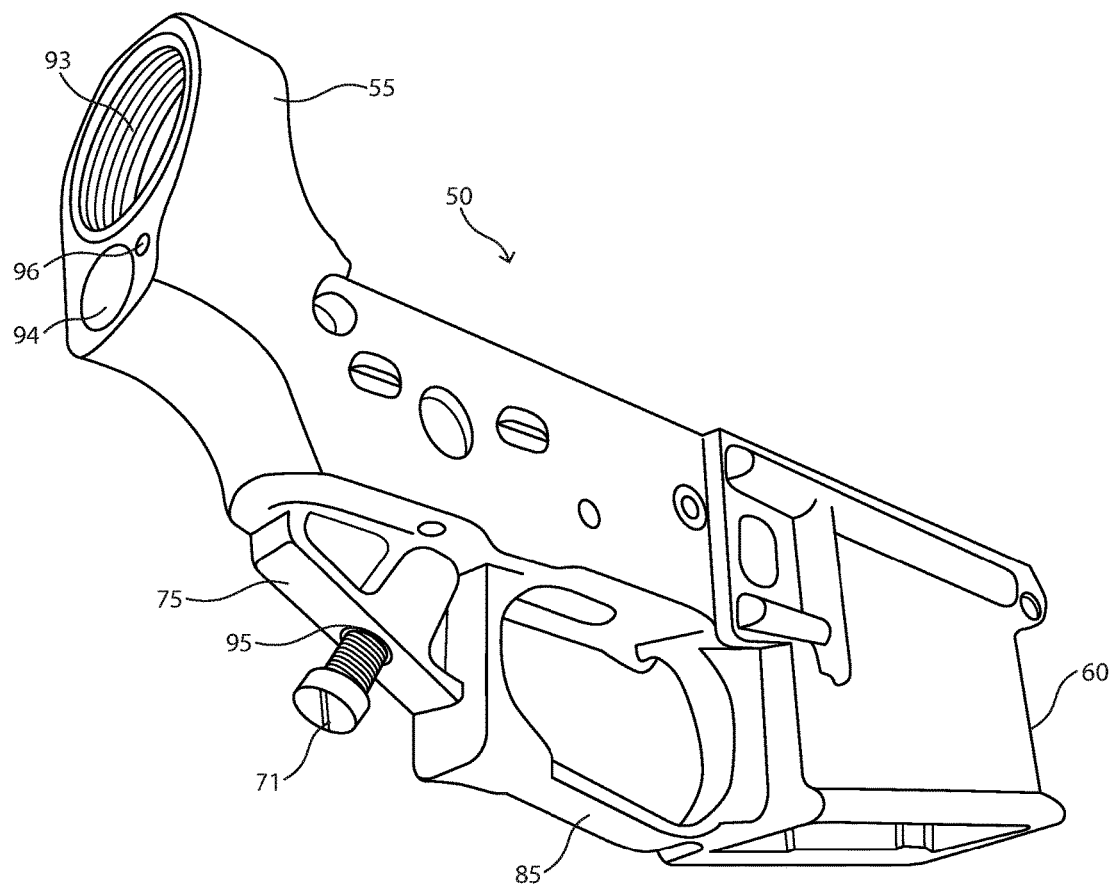
FIG. 6 is a rear perspective view of the hybrid lower receiver of FIG. 4 showing a pistol grip retaining screw protruding from the second threaded metal insert.
Figure 7:
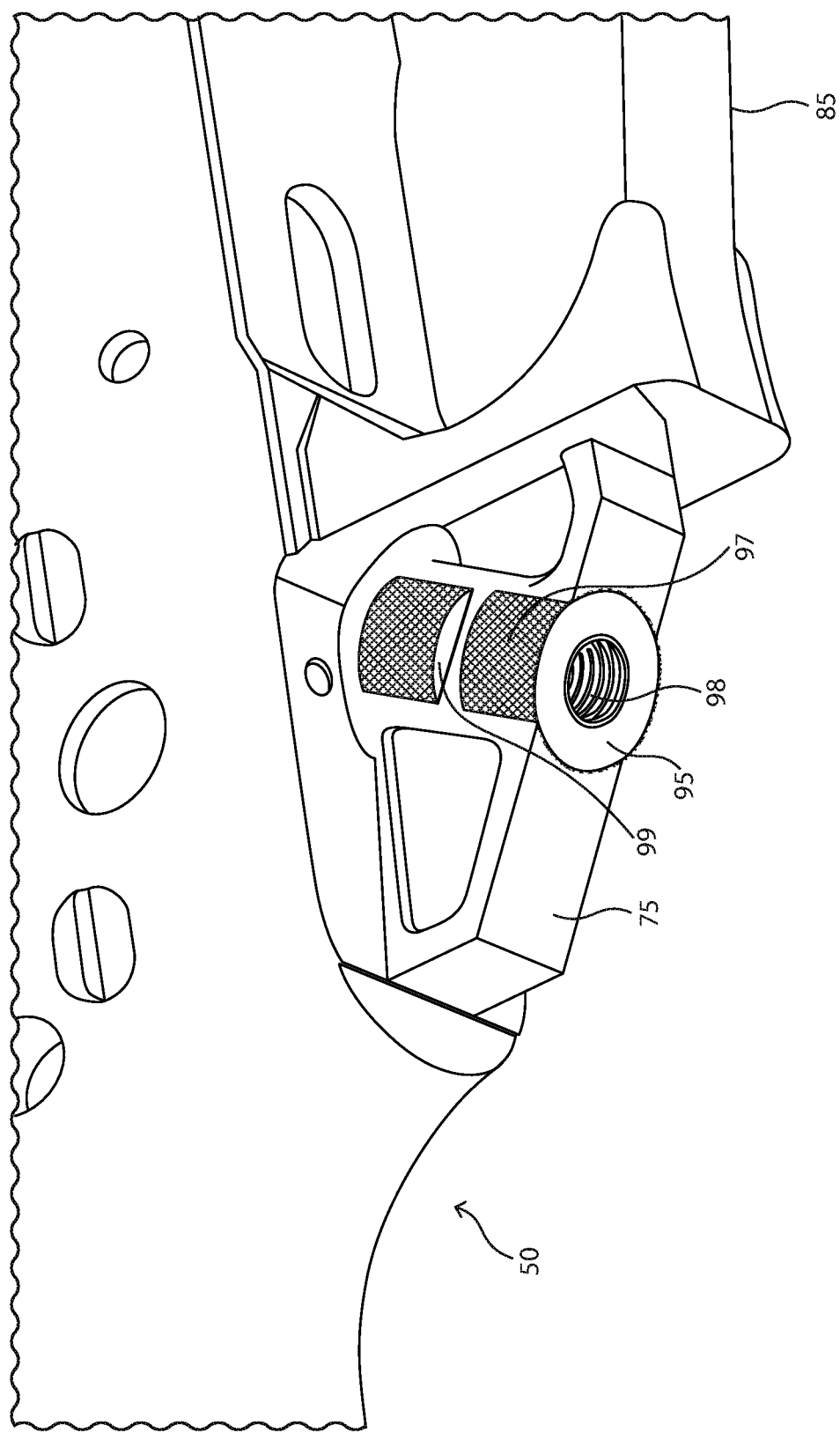
FIG. 7 is a rear perspective detail view of another hybrid polymer lower receiver showing the pistol grip attachment point with an alternate embodiment of a threaded metal insert embedded therein.

It is to be understood that the inserts disclosed herein can take any overall shape so long as at least a portion of an insert body is contoured to be integrally embedded within a portion of a lower receiver in a way that does not interfere with proper operation of the assembled firearm. Inserts may also be shaped or contoured to generally resemble or fit inside the portion of a lower receiver in which they are integrally embedded or molded. Inserts can also generally be contoured to maintain or reinforce the structural integrity of the portion of a polymer lower receiver in which they are embedded from the high stresses placed upon the receiver by normal use. In some embodiments, the inserts are sized and contoured to be at least partially embedded within a traditionally threaded portion of a polymer lower receiver for an AR type firearm such as the buffer tube collar 55 or the pistol grip attachment point 75. For example, as illustrated in FIG. 3, an insert 90 can take the shape of a generally circular ring having an interior surface configured with screw threads 93. Alternatively, as illustrated in FIG. 7, a threaded insert 95 may have a generally cylindrical shape. Additionally, a threaded metal insert can have a generally ovoid, polyhedron or other symmetrical shape, or an irregular shape (not pictured). Furthermore, a threaded insert 90 can be completely embedded within a portion of a polymer lower receiver so that only the interior threads 93 of the insert 90 remain exposed, as shown in FIGS. 5-6, or only partially embedded in polymer so that the interior threads 98 as well as portions of the insert's exterior surface 97 remain exposed, as shown in FIG. 7.

The interior of the aperture is configured with screw threads complimentary to the threads on a typical prior art buffer tube or pistol grip screw. Put differently, screw threads are disposed on the interior surface of an insert. In some embodiments, the threads are comm-spec threads. In other embodiments, the threads are mil-spec threads. Although the exterior diameter of a threaded metal insert may generally range from approximately 0.30 to 1.50 inches, according to the particular lower receiver body it is intended to be embedded within, the diameter of the substantially circular aperture (i.e., the "interior diameter") can range from approximately 0.20 to 1.18 inches.

In some embodiments, the exterior diameter of a threaded insert can be approximately 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50 inches or more. In other embodiments, the exterior diameter of a threaded insert can be approximately 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.35, 1.36, 1.37, 1.38, 1.39, 1.40, 1.41, 1.42, 1.43, 1.44, 1.45, 1.46, 1.47, 1.48, 1.49, 1.50 inches or more. In certain embodiments, the exterior diameter is approximately 1.30, 1.31, 1.32 or 1.33 inches. In additional embodiments, the exterior diameter is approximately 0.34 or 0.35 inches.

In some embodiments, the interior diameter of a threaded insert can be approximately 0.20, 0.21, 0.22, 0.23, 0.24, 0.25, 0.26, 0.27, 0.28, 0.29, 0.30, 0.31, 0.32, 0.33 inches or more. In certain embodiments, the interior diameter is 0.240, 0.241, 0.242, 0.243, 0.244, 0.245, 0.246, 0.247, 0.248, 0.249, 0.250, 0.251, 0.252, 0.253, 0.254, 0.255, 0.256, 0.257, 0.258, 0.259 or 0.260 inches. In one embodiment, the interior diameter is approximately 0.248 inches. In other embodiments, the interior diameter of a threaded insert can be approximately 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20 inches or more. In certain embodiments, the interior diameter is 1.141, 1.142, 1.143, 1.144, 1.145, 1.146, 1.147, 1.148, 1.149, 1.150, 1.151, 1.152, 1.153, 1.154, 1.155, 1.156, 1.157, 1.158, 1.159, 1.160, 1.161, 1.162, 1.163, 1.164, 1.165, 1.166, 1.167, 1.168, 1.169, 1.170, 1.171, 1.172, 1.173, 1.174, 1.175, 1.176, 1.177, 1.178, 1.179, 1.180, 1.181, 1.182, 1.183, 1.184, 1.185, or 1.186 inches. In one embodiment, the interior diameter is approximately 1.00 inches.

A threaded insert can be made of any metal or metallic material suitable for use in a firearm. More pointedly, the inserts disclosed herein can be made from any suitably tough metal or metallic material having sufficient strength and durability to withstand sustained contact with the screw threads of a typical metal buffer tube or a metal pistol grip screw during repeated discharge of an AR type firearm. In some embodiments, the metal or metallic material is marine grade brass, steel, aluminum, anodized aluminum, cast zinc, titanium, brass, copper, or a metallic alloy. Use of the foregoing materials to form threaded inserts in the disclosed shapes results in a light weight insert which advantageously does not significantly or substantially affect the weight of a hybrid polymer lower receiver comprising such an insert. A threaded metal insert constructed in accordance with the present disclosure can weigh approximately 3 to 20 grams. In some embodiments, a threaded metal insert for a pistol grip screw attachment point weighs approximately 4 to 8 grams. In other embodiments, a threaded metal insert for a buffer tube collar weighs approximately 12 to 19 grams. In certain embodiments, a threaded insert can weigh approximately 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5 or 20.0 grams or more.

Referring again to FIG. 3, a threaded insert can further include one or more textural features that impart texture to the exterior surface of the insert and which aid in making the insert integral to the hybrid polymer lower receiver body. Appropriate exterior surface textural features are those which are not easily broken or worn off and which can interface with and hold polymer during the molding process to permanently embed the insert in the polymer. Such textural features are designed make the insert irremovable from the polymer lower receiver body under normal use. For example, suitable textural features include, but are not limited to, relief channels or cuts, notches, divots, depressions, knurling, cross hatching, shallow holes or pits, or other similar features which impart texture to the exterior surface so that polymer may gain purchase on the insert during the molding process. In one embodiment shown, the exterior surface of an insert 90 is configured with an expanse of diamond knurling 92 bounded by two opposing parallel relief channels 91. In another embodiment shown in FIG. 7, the exterior surface of the insert 95 is configured with knurling 97 and a cut-out or notch 99. The use of textural features on the exterior surface of threaded inserts strengthens the completed hybrid polymer lower receiver body and decreases the number of potential failure points by reducing the chances that a threaded insert will pull out of a receiver under normal use and conditions. Moreover, as shown in FIGS. 3 and 7, respectively, the relief cuts 91 and the notch 99 are disposed on the exterior surface of the inserts at a substantially perpendicular angle to the direction in which a separate threaded component, such as a buffer tube or pistol grip screw, would be inserted and removed. The orientation of these textural surface features further protects the inserts from being pulled out of the polymer by creating a ticker layer or ribbon of polymer between the inserts and the direction of the mostly likely source of outward-pulling stress.

Figure 4:
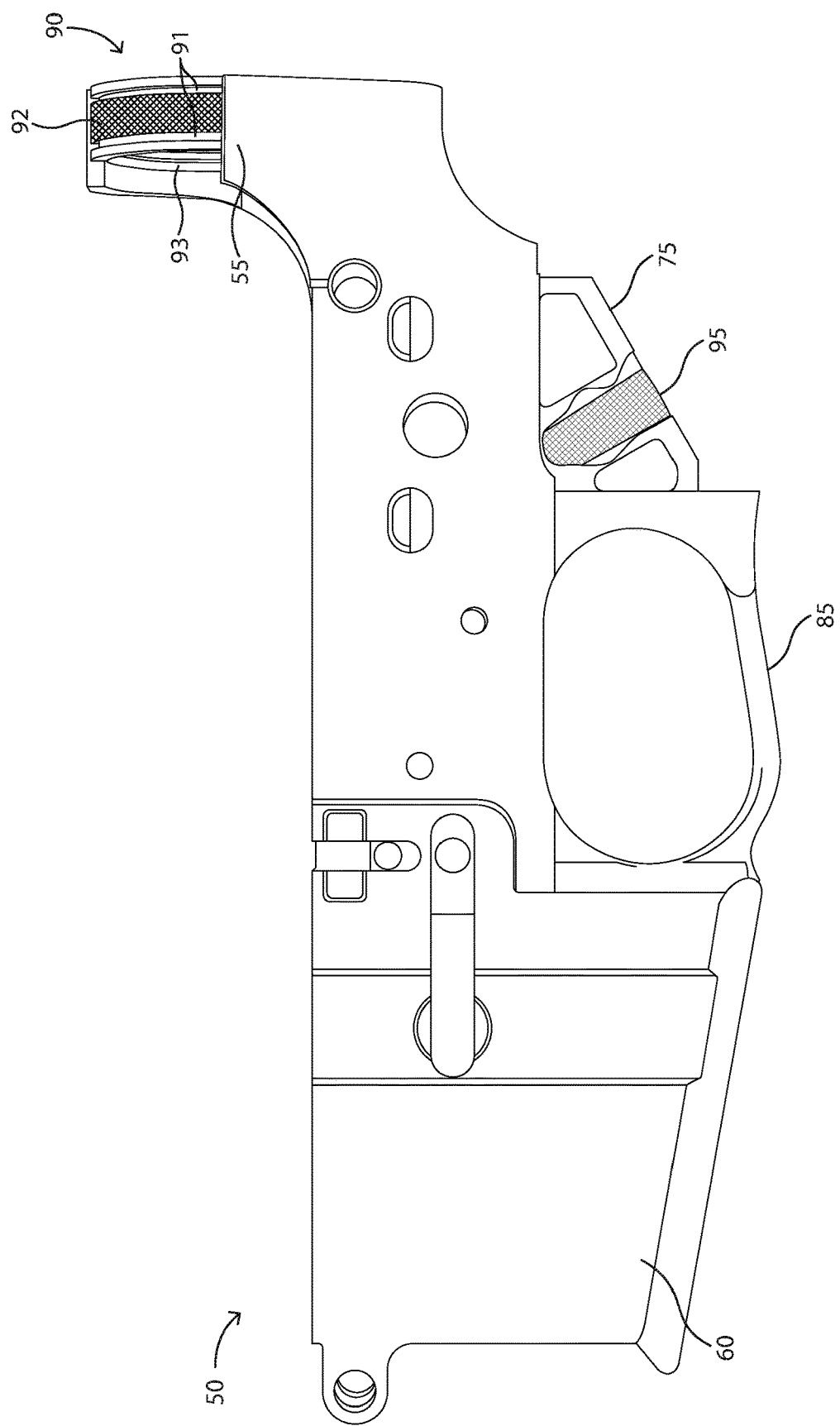
FIG. 4 is a left side partial cutaway elevation of one embodiment of a stripped hybrid polymer lower receiver disclosed herein showing the threaded metal insert of FIG. 3 as well as a second threaded metal insert of another embodiment embedded therein.

Referring now to FIGS. 4-6, there is illustrated one embodiment of a hybrid polymer lower receiver 50 constructed in accordance with an aspect of the disclosure. A hybrid lower receiver 50 is generally a stripped polymer lower receiver for an AR type firearm, such as an AR-15 rifle, having one or more threaded metal inserts of the present disclosure at least partially embedded therein. For example, the hybrid polymer lower receiver may include a first threaded insert, which may be threaded to receive a buffer tube (a "buffer tube insert"). The hybrid polymer lower receiver may also or alternatively include a second threaded insert, which may be threaded to receive a pistol grip retaining screw (a "pistol grip insert"). In some embodiments, the hybrid lower receiver 50 can include a buffer tube insert 90 embedded in the buffer tube collar 55. In other embodiments, the hybrid lower receiver 50 can include a pistol grip insert 95 embedded in the pistol grip attachment point 75. In the embodiment shown in FIGS. 4-6, the hybrid polymer receiver comprises a stripped polymer lower receiver for an AR type firearm having a buffer tube insert 90 and a pistol grip insert 95 completely embedded in the buffer tube collar 55 and the pistol grip attachment point 75, respectively, so that only the internal threads are exposed. Specifically, as shown in FIG. 6, only the internal threads 93 on the interior surface of the buffer tube insert 90 are exposed for engagement with a buffer tube (not pictured), while the internal threads of the pistol grip insert 95 are depicted as engaged by a pistol grip screw 71. Notably, the threaded metal inserts 90, 95 do not inhibit or obstruct access, use or function of the receiver plate recess 94, the takedown pin spring and detent recess 96, or any of the other various recesses, holes and grooves in the lower receiver body 50 designed to receive the operational components of a typical lower receiver assembly for an AR type firearm, such as those depicted in FIGS. 1-2. The threaded metal inserts disclosed herein are suitable for use in polymer lower receivers for AR type firearms in any caliber, including but not limited to .223 and .308 WINCHESTER, as well as their NATO equivalents.

Referring again to FIG. 4, the cutaway portions of the buffer tube collar 55 and pistol grip attachment point 75 illustrate how the textural features on the exterior surface of the buffer tube insert 90 and pistol grip insert 95 interface with and are molded into the polymer material forming the lower receiver body 50. Specifically, the polymer forming the buffer tube collar 55 fills the channel cuts 91 and diamond knurling 92 on the exterior surface of the buffer tube insert 90, while the polymer forming the pistol grip attachment point 75 likewise fills the knurling on the exterior surface of the pistol grip insert 95. In this way, the two inserts 90, 95 are made permanently integral to and irremovable from the buffer tube collar 55 and pistol grip attachment point 75, respectively. Although the hybrid polymer lower receiver 50 is illustrated and described as having first and second threaded metal inserts 90, 95 embedded therein, it is to be understood that a hybrid polymer receiver 50 may have only one threaded metal insert embedded therein, for example, in either the buffer tube collar 55 or the pistol grip attachment point 75. For example, in one embodiment (not shown), a hybrid polymer lower receiver 50 includes a threaded metal insert at least partially embedded within the buffer tube collar 55, but no second insert embedded within the pistol grip attachment point 75. It should be noted, however, that the use of two threaded metal inserts, as opposed to one, does not significantly impact the overall weight of a hybrid polymer lower receiver. For example, a hybrid polymer and metal lower receiver body constructed in accordance with the present disclosure can weigh less than 10 ounces. In some embodiments, the stripped hybrid receiver weighs less than 8.0 ounces. In certain embodiments, a stripped hybrid receiver comprising two threaded metal inserts disclosed herein weighs approximately 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9 or 8.0 ounces.

Referring now to FIG. 7, there is illustrated a rear perspective detail view of another embodiment of a hybrid polymer lower receiver 50. The pistol grip attachment point 75 rearward of the trigger guard 85 includes an alternate embodiment of a threaded metal insert 95 partially embedded therein. The interior threads 98 are exposed and configured to receive a pistol grip screw (such as the screw identified in FIG. 6 by the numeral 71). The exterior surface of the insert 95 includes two textural features—knurling 97 and a notch 99—both of which are partially exposed through the polymer. The notch 99 is filled with polymer that bisects the exposed knurling 97 into two sections. As noted above, the notch 99 is perpendicular to the direction of stress encountered during normal use and reduces the likelihood that the insert 95 will pull out from the pistol grip attachment point 75 by providing a stronger point of contact between the insert 95 and the polymer than knurling 97 alone. It is to be understood that although the insert 95 is depicted as being generally cylindrical and partially embedded within the polymer, the insert 95 could be fully embedded within the pistol grip attachment point 75 or take any other shape suitable to accept a pistol grip screw 71 but not interfere with the attachment of a pistol grip.

Figure 8:
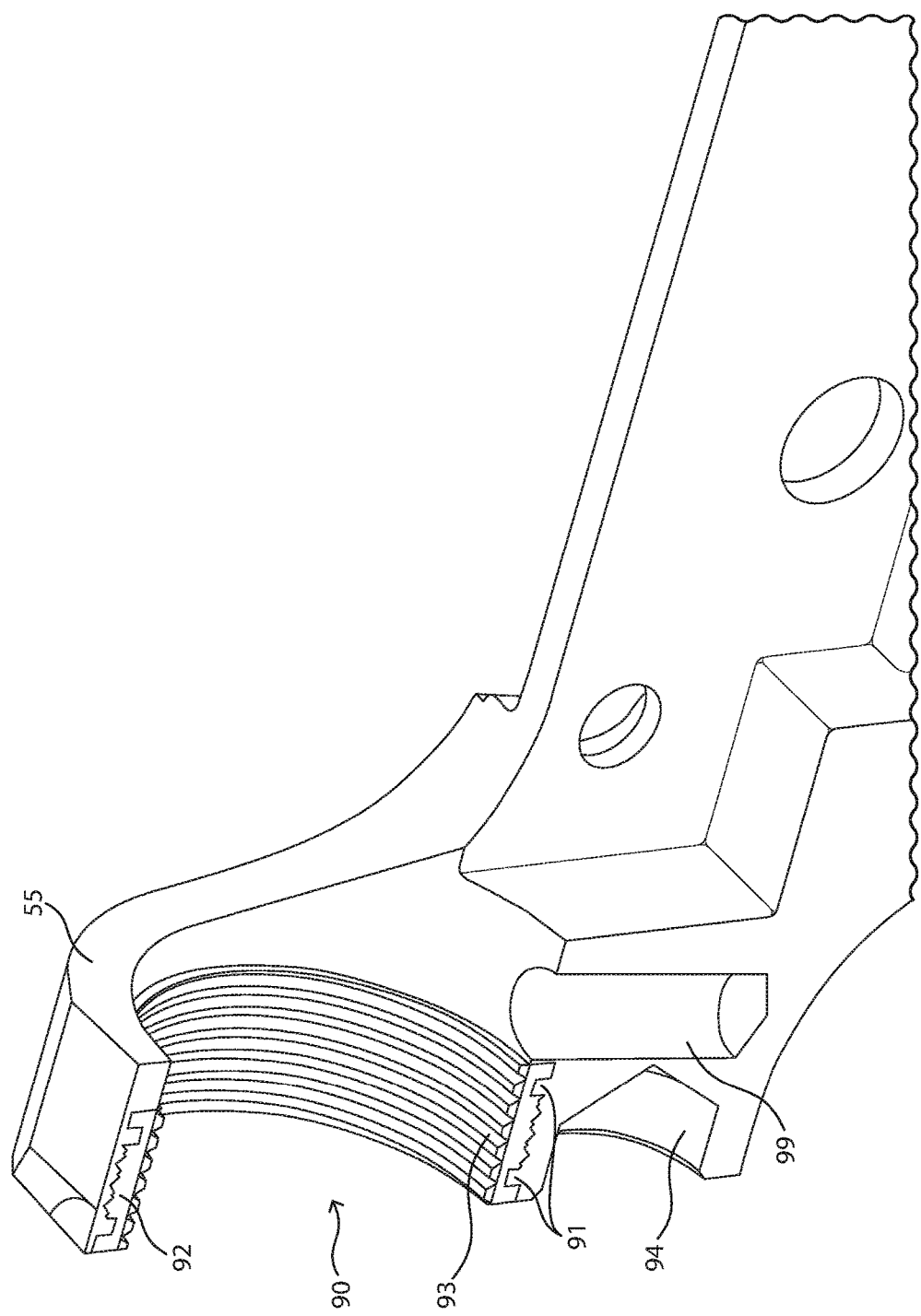
FIG. 8 is a cross section detail view of the buffer tube collar of one embodiment of a hybrid polymer lower receiver disclosed herein.

Referring now to FIG. 8, there is illustrated a cross sectional detail view of another embodiment of a hybrid polymer lower receiver 50 showing a buffer tube insert 90 embedded within the buffer tube collar 55. The insert 90 is completely embedded within the buffer tube collar 55; only the interior threads 93 are exposed. The insert 90 comprises two relief channels 91 and knurling 92 on the exterior surface. The relief channels 91 and knurling 92 are visibly filled with polymer near the top and bottom of the buffer tube collar 55. The threaded metal insert 90 does not overlap or obstruct either the receiver plate recess 94 in the rear of the lower receiver body or the buffer retainer and buffer retainer spring recess 99 in the rear of the central cavity of the receiver body. Although the buffer tube insert 90 shown in FIG. 8 is depicted as a generally circular ring, it is to be understood that alternate embodiments of the insert 90 may take a different shape. For example, in some embodiments, the insert 90 may be an irregular polygonal or ovoid shape and overlap one or more of the receiver plate recess 94 and buffer retainer and buffer retainer spring recess 99. However, in such embodiments, the insert 90 may be embedded with a larger portion of the rear of the receiver body and may weigh more than a smaller ring-shaped insert. Such inserts may further comprise one or more cavities, holes or recesses having a shape and size suitable to allow a separate receiver plate or buffer retainer and buffer retainer spring to pass through the insert and function normally. Other larger or asymmetrically-shaped threaded inserts constructed in accordance with aspects of the present disclosure that are designed to be embedded within or cover other or larger areas of the lower receiver body may similarly comprise one or more cavities, holes or recesses positioned to allow the insertion of one or more operational components designed to interface with a corresponding cavity, hole or recess otherwise blocked by a portion of the insert.

Accordingly, in accordance with another aspect of the present disclosure, there are also disclosed herein hybrid polymer and metal lower receiver assembly kits comprising a stripped hybrid polymer lower receiver having one or more threaded metal inserts at least partially embedded therein, and the operational components of a lower receiver parts kit. In one embodiment, a hybrid polymer and metal lower receiver assembly kit comprises a stripped hybrid polymer lower receiver having one or more threaded metal inserts at least partially embedded therein, and at least one of: a trigger, a hammer, a selector switch, a magazine catch, a bolt catch, a takedown pin, a pivot pin, a spring, a selector detent pin, a takedown detent pin, a pivot pin detent, a trigger pin, a hammer pin, and a trigger disconnect.

In accordance with yet another aspect of the present disclosure, there is disclosed herein a method of forming a hybrid polymer lower receiver body using one or more threaded metal inserts in conjunction with a molding process. In some embodiments, the method comprises providing one or more threaded metal inserts disclosed herein, inserting said one or more threaded metal inserts into an injection mold designed for the inclusion of metallic inserts, closing the mold around said one or more threaded metal inserts, and injecting polymer into the mold so that said inserts become at least partially embedded therein. The injection mold can be any kind of mold, but in one embodiment, is a high pressure injection mold. High pressure injection causes the polymer to flow around and fill any textural features present on the external surface of said insert or inserts, but not the internal threads. In additional embodiments, said inserts comprise internal threads which remain exposed for use by the end user. In other embodiments, the method may further comprise selecting one or both of an AR style buffer tube and pistol grip screw for use with the hybrid lower receiver, and determining the proper complimentary thread needed for the selected buffer tube or pistol grip screw. Once complete, a user may then insert metal screws into the threaded metal inserts of the hybrid polymer lower receiver with no reduction in receiver longevity.

It should be understood, of course, that the foregoing relates to exemplary embodiments of the invention and that modifications may be made without departing from the spirit and scope of the invention as set forth in the following claims.

INTERPRETATION

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

While the disclosure above sets forth the principles of the invention disclosed herein, with examples given for illustration only, those skilled in the art will appreciate from the foregoing that various adaptations and modifications of the just described embodiments can be configured in various respects without departing from the scope and sprit of the invention. The inventors expect that skilled artisans will employ various obvious changes in form and detail, and the inventors intend for the invention to be practiced other than as specifically described herein. Accordingly, the invention includes all equivalents and usual and obvious modifications of the subject matter recited in the claims appended hereto as permitted by applicable law. Moreover, any combination of the above-described features and elements in all possible variations hereof is encompassed by the invention unless otherwise indicated herein or otherwise clearly contradicted by context. Therefore, it is to be understood that the invention must be measured by the scope of the appended claims and not by the description of the examples or the preferred embodiments.

What is claimed is:

1. A hybrid lower receiver for a firearm, comprising:
   (a) a polymer lower receiver body having an integral polymer receiver extension housing and a pistol grip attachment portion, the receiver extension housing extending upwardly from a rear portion of said body, the receiver extension housing configured to receive a receiver extension therethrough; and
   (b) at least one metal disc embedded within said receiver extension housing or said pistol grip attachment portion, said disc having entirely planar forward and rearward surfaces and an aperture defined therethrough, the aperture configured to threadingly engage said receiver extension or a pistol grip retaining screw when said receiver extension or said pistol grip retaining screw is received in said aperture.

2. The hybrid lower receiver of claim 1, wherein said disc is embedded within said receiver extension housing.

3. The hybrid lower receiver of claim 2, further comprising a second metal disc embedded within said pistol grip attachment portion, said second disc configured to threadingly engage said pistol grip screw.

4. The hybrid lower receiver of claim 1, wherein said disc include a continuous complete ring structure.

5. The hybrid lower receiver of claim 1, wherein said disc comprises an exterior circumference having one or more textural features configured to permanently retain said disc within said polymer lower receiver body.

6. A hybrid lower receiver for a firearm, comprising:
(a) a polymer lower receiver body having an integrally molded polymer buffer tube collar extending upwardly from a rear portion of said body, the buffer tube collar configured to receive a buffer tube therethough;
(b) a metal disc embedded within said buffer tube collar, wherein said disc is configured to releasably engage said buffer tube when said buffer tube is received in said buffer tube collar.

7. A hybrid lower receiver for a firearm, comprising:
(a) a polymer lower receiver body having an integrally molded polymer receiver extension housing extending upwardly from a rear portion of said body, the receiver extension housing configured to receive a receiver extension therethough;
(b) a metal disc embedded within said receiver extension housing, wherein said metal disc includes a continuous complete ring structure and entirely planar forward and rearward surfaces; and
(c) a threaded aperture extending through said ring structure, the aperture sized and shaped to couplingly engage said receiver extension.

* * * * *